United States Patent
Seal et al.

(10) Patent No.: US 8,326,749 B1
(45) Date of Patent: Dec. 4, 2012

(54) SYSTEMS AND METHODS OF A MORTGAGE PRICING SERVICE

(75) Inventors: Mark E. Seal, Vienna, VA (US); James Quartey, Centerville, VA (US); Suresh S. Kalkavery, Fairfax, VA (US)

(73) Assignee: Federal Home Loan Mortgage Corporation (Freddie Mac), McLean, VA (US)

( * ) Notice: Subject to any disclaimer, the term of this patent is extended or adjusted under 35 U.S.C. 154(b) by 0 days.

(21) Appl. No.: 13/413,792

(22) Filed: Mar. 7, 2012

Related U.S. Application Data

(60) Division of application No. 13/013,989, filed on Jan. 26, 2011, now Pat. No. 8,209,258, which is a continuation-in-part of application No. 11/600,724, filed on Nov. 17, 2006, now Pat. No. 7,882,025.

(60) Provisional application No. 60/737,738, filed on Nov. 18, 2005.

(51) Int. Cl.
*G06Q 40/00* (2006.01)

(52) U.S. Cl. .......................................................... 705/38

(58) Field of Classification Search ...................... 705/38
See application file for complete search history.

(56) References Cited

U.S. PATENT DOCUMENTS

| | | | |
|---|---|---|---|
| 6,125,355 A | 9/2000 | Bekaert et al. | |
| 6,611,822 B1 * | 8/2003 | Beams et al. | 706/11 |
| 6,635,089 B1 * | 10/2003 | Burkett et al. | 715/235 |
| 6,744,449 B2 | 6/2004 | MacLeod et al. | |
| 7,281,018 B1 | 10/2007 | Begun et al. | |
| 2003/0009402 A1 * | 1/2003 | Mullen et al. | 705/35 |
| 2004/0225594 A1 | 11/2004 | Nolan, III et al. | |
| 2005/0102229 A1 | 5/2005 | Kemper et al. | |
| 2005/0203839 A1 | 9/2005 | Dowell et al. | |

* cited by examiner

*Primary Examiner* — Lindsay M. Maguire
(74) *Attorney, Agent, or Firm* — Finnegan, Henderson, Farabow, Garrett & Dunner, LLP

(57) ABSTRACT

Systems, methods, and computer program products are provided for creating and using a common, generic, data/object model to represent information grids or lookup tables, such as a mortgage asset pricing information grid, mortgage asset re-pricing grid, and credit risk pricing grid. The common model allows a common software representation for logically different attributes.

11 Claims, 8 Drawing Sheets

| Grid_Def Table (Defines an Information Grid) | | | |
|---|---|---|---|
| id_grid | The unique grid Id | | |
| name_grid | name of grid | | |
| grid_root | Reference to starting node of grid | | |
| id_version | id_version to allow for multiple versions | | |
| | | | |
| id_grid | name_grid | grid_root | id_version |
| 1885 | bubd | 10001 | 1 |

FIG. 4-A

| Grid_Schema (Meta Data to build Structure into tree) | | | |
|---|---|---|---|
| id_grid | The unique grid Id | | |
| level_order | The level in the grid graph structure | | |
| node_type | The type of node | | |
| id_version | id_version to allow for multiple versions | | |
| | | | |
| id_grid | level_order | node_type | id_version |
| 1885 | 1 | 45 | 1 |
| 1885 | 2 | 46 | 1 |
| 1885 | 3 | 47 | 1 |
| 1885 | 4 | 48 | 1 |
| 1885 | 5 | 49 | 1 |
| 1885 | 5 | 50 | 1 |

FIG. 4-B

| Node_Type (define a node e.g. master commitment) | | |
|---|---|---|
| nodeType | The Type of Node | |
| node_desc | The description or name of node | |
| datatype | Data type of node | |
| | | |
| nodeType | node_desc | datatype |
| 45 | masterCommitmentNumber | 100 |
| 46 | RiskClass | 100 |
| 47 | NoteRate | 101 |
| 48 | RemainingMaturity | 102 |
| 49 | buyup | 103 |
| 50 | buydown | 103 |

| Data_Type (Meta data to build Structure and determine data type of node) | |
|---|---|
| datatype | Data type of node |
| name_data_type | primitive data type of node e.g., int, float string |
| operator_type | kind of operation that can be applied e.g. RI (range inclusive) |
| val_min | predefine minimum value of range if datatype is range |
| val_max | predefine maximum value of range if datatype is range |
| isRange | Flag to indicate whether this datatype represents a range |
| Bucket_order | The bucket's number for number of buckets/ranges defined |

431

| datatype | name_data_type | operator_type | val_min | val_max | isRange | bucket_order |
|---|---|---|---|---|---|---|
| 100 | String | | | | N | |
| 101 | double | RI | 0 | 4.624 | Y | 1 |
| 101 | double | RI | 4.625 | 4.749 | Y | 2 |
| 101 | double | RI | 4.75 | 4.874 | Y | 3 |
| 102 | double | RI | 160 | 240 | Y | 1 |
| 102 | double | RI | 80 | 159 | Y | 2 |
| 102 | double | RI | 0 | 79 | Y | 3 |
| 103 | double | | | | N | |

444 — rows with datatype 101
445 — row with bucket_order 1 for datatype 101
442 — rows for datatype 102
446 — rows with datatype 102
447 — bucket_order column values
448 — row with datatype 103

| Grid_Node (Contains actual value of node and reference to parent) | |
|---|---|
| id_grid | The unique grid Id |
| id_node | Unique Id of node |
| node_type | The type of node |
| ValueNode | value of Node |
| parentNode | reference to parent node, null for root node |
| id_version | id_version to allow for multiple versions |

451

| id_grid | id_node | node_type | ValueNode | parentNode | id_version |
|---|---|---|---|---|---|
| 1885 | 10001 | 45 | mc123455 | | 1 |
| 1885 | 10002 | 46 | C1 | 10001 | 1 |
| 1885 | 10003 | 47 | 1 | 10002 | 1 |
| 1885 | 10004 | 48 | 1 | 10003 | 1 |
| 1885 | 10005 | 49 | 2.8 | 10004 | 1 |
| 1885 | 10006 | 50 | 4.5 | 10004 | 1 |

SYSTEMS AND METHODS OF A MORTGAGE PRICING SERVICE

RELATED APPLICATIONS

This application is a division of application Ser. No. 13/013,989, filed Jan. 26, 2011 now U.S. Pat. No. 8,209,258, which is a continuation-in-part of application Ser. No. 11/600,724, filed Nov. 17, 2006, now U.S. Pat. No. 7,882,025, which claims benefit of Provisional Application No. 60/737,738, filed Nov. 18, 2005, each of which are incorporated herein by reference.

TECHNICAL FIELD

The present invention generally relates to systems and methods for representing and managing data and information from an information grid, and more particularly, to systems and methods for representing and managing the information from an information grid for determining the price for a mortgage or mortgage-backed security or a re-price of a currently owned mortgage or mortgage-backed security.

BACKGROUND

Many people that purchase a home borrow funds from a lender, such as a local bank, and grant the lender a mortgage, that is, a security interest in the home, which serves as collateral. The loan taken out by the homebuyer is known as a mortgage loan or, mere commonly, as simply a "mortgage." Each mortgage loan has many different attributes that characterize it by homebuyer characteristics, property characteristics, lender characteristics, loan product characteristics, and municipality characteristics, among others.

Lenders sell many of the mortgage loans that they originate into the secondary mortgage market. By purchasing mortgage loans, buyers in the secondary mortgage market provide lenders with capital to lend to subsequent homebuyers, allowing the lenders to meet consumer demand for additional home mortgages. In other words, the lenders lend to new homebuyers the money received from the sale of a mortgage in the secondary market. Thus, the secondary market for mortgage loans provides a new supply of money for housing, lowering the cost of money and ultimately lowering the cost of home ownership for consumers. The Federal Home Loan Mortgage Corporation (Freddie Mac), the Federal National Mortgage Association (Fannie Mae), and the Government National Mortgage Association (Ginnie Mae) are some of the major buying participants in the secondary mortgage market.

Secondary mortgage market buyers typically either purchase a home mortgage for cash, issue a security in exchange for a mortgage, or more commonly issue one or more securities for a group or pool of mortgages. In general, a mortgage pool is a positively identified group of mortgage assets combined for sale or some other purpose. The phrase "mortgage assets" generally refers to mortgages and/or mortgage-backed securities. A security that is exchanged for a mortgage loan(s) is often known as a mortgage-backed security (MBS). An MBS is typically a pass-through security representing an undivided beneficial interest in one or more pools of mortgage loans. An MBS is called a "pass-through" security because some percentage of the borrowers' payments of principal and interest are passed through to holders of interests in the MBS. An MBS may be backed by mortgage loans originated by one or more lenders.

Generally, mortgage asset purchasers determine the price they are willing to pay a seller for a mortgage asset based on the mortgage asset's attributes or characteristics, such as the risk associated with the mortgage asset (e.g., credit risk, prepayment risk, etc), the note rate (i.e., the interest rate paid by the borrower), the remaining maturity (e.g., the number of months remaining before a mortgage is paid off by the borrower), the FICO score (i.e., credit rating) of the borrower, the geographical location of the property securing a mortgage, etc.

The total or net price of a mortgage asset is typically comprised of two or more price components. Price components are usually determined independently of each other because each is typically based on only the attribute(s) of the mortgage asset that affect each particular price component independent of the other price components. The price components combine to form the net price for a particular mortgage asset. For example, the net price of a mortgage asset may comprise a guarantee fee (Gfee) component, plus a seller adjustment amount component, minus a buy-down amount component (or plus a buy-up amount component).

Some price components for a mortgage loan may be based on the expected future value of an MBS that will be issued backed by the mortgage loan. For example, interest-only securities backed by mortgage loans that are not likely to be prepaid (paid off before maturity) are more valuable than interest-only securities backed by mortgage loans that are likely to be prepaid, so a purchaser may be willing to pay more for not-likely-to-be-prepaid mortgage loans. Conversely, a purchaser who intends to issue interest-only securities may set a lower price when purchasing mortgage loans that are likely to be prepaid.

In sum, multiple attributes feed into each pricing component and multiple pricing components feed into net price. A logical way to organize these attributes and the value of the components is in an information grid format, or a lookup table. Lookup table organization of information is common in many other areas that use two or more attributes to determine a desired value, not only the mortgage asset pricing arena.

A mortgage asset purchaser may wish to quickly customize an offer price for a mortgage asset(s) for a particular customer or a particular situation. For example, a purchaser such as Freddie Mac may wish to give a special discount to a large bank for mortgages having certain characteristics that are immediately available. This makes an easily modifiable pricing mechanism desirable.

Mortgage asset purchasers may also wish to quickly modify the pricing mechanism to take advantage of new information. For example, a purchaser may identify a previously unrecognized correlation between a certain mortgage asset attribute and its expected behavior, such as a correlation between a certain risk class attribute of a mortgage loan and low prepayment speed of the mortgage. In such a case, the purchaser may increase the price it is willing pay for mortgages with the identified risk class attribute, knowing that certain securities backed by those mortgages will be more valuable because of the low prepayment speed. Conversely, mortgages lacking the identified risk class attribute may have their price lowered. This also illustrates the desirability of an easily modifiable pricing mechanism.

A typical secondary market purchaser may often have to determine the price of a large batch of mortgage loans in a short period of time. For example, a purchaser such as Freddie Mac may buy 10,000 mortgage loans at a time from a large bank and have to determine a total price for the 10,000 mortgage loans overnight for settlement the next day. In some cases, the pricing must be accomplished in a matter of minutes not hours. This makes a fast pricing mechanism desirable.

Current systems typically use a computer executing dedicated software applications (such as a custom pricing engine) and data models to determine the net price for a mortgage asset. Multiple applications using multiple data models to represent pricing grid information have been custom built for each problem. In current systems, in order for the pricing of a mortgage asset to take into account a new attribute, the pricing engine must be modified. Modifying software applications is time-consuming, cumbersome, and error prone. Thus, current systems are not easy to modify. Moreover, customized modifications to mortgage pricing engines often result in inconsistent pricing for different, and similar, mortgage assets.

In addition, current systems may use a grid-specific, tabular data model to hold the pricing information for mortgage assets. The object model and database schema are custom tailored to each specific information grid format, as is the source code of applications using the data. Consequently, implementing a change to add a new attribute (i.e., to change the information grid) typically requires changes to the database table to add new rows and columns, changes to the user interface application that maintain the database, new logic for the application(s) that access the database to compute pricing components, and new data conversion routines. It is difficult to implement this series of changes quickly and correctly.

SUMMARY

Embodiments consistent with the invention include systems, methods, and computer program products for representing an information grid having a plurality of cells, each cell having a value and a location in the information grid, that include operations and components for creating a generic data structure that holds any type of value contained in the information grid; storing the value of a cell in the generic data structure; creating a metadata component, associated with the generic data structure, that holds a description of the value stored in the generic data structure and a description of the location of the cell within the information grid; storing, in the metadata component, information describing the value stored in the generic data structure and information describing the location of the cell within the information grid; accessing the generic data structure according to the location of the cell in the information grid; and displaying the value stored in the accessed generic data structure.

Other embodiments consistent with the invention include systems, methods, and computer program products for managing pricing information for a product, implemented on a computer, that include operations and components for displaying a table form to a user, the table form having columns and rows; accepting inputs from the user that specify attributes of the product as column identifiers; accepting inputs from the user that specify values of the product for each specified attribute in a row; representing the table form, including the inputs that specify attributes and the inputs that specify values, in a generic tree structure in a memory of the computer; accepting a persist command from the user; converting the tree structure to a generic flat tabular representation of the table; and storing the flat tabular representation of the table in a data storage device communicatively connected to the computer for later retrieval to calculate a price for the product and a price for a credit risk associated with the product.

Yet other embodiments include systems, methods, and computer program products for managing pricing information for a product, that include operations and components for identifying a plurality of price components that contribute to a net price of the financial product; representing the plurality of price components in a plurality of pricing grids; converting the plurality of pricing grids into a plurality of generic data structures, wherein the generic data structures contain a value for each cell of a pricing grid and information describing each cell and the value; creating a common interface to access the plurality of generic data structures; invoking the common interlace to retrieve the plurality of price components from the plurality of generic data structures; and utilizing the retrieved plurality of price components to determine the net price of the financial product and a price for a credit risk associated with the financial product.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate various features, embodiments and aspects of the invention and, together with the description, explain advantages and principles of the invention. In the drawings.

FIGS. 4-A through 4-E illustrate exemplary data structures for a tree representation of an information grid, consistent with the principles of the invention;

FIG. 6 shows an exemplary embodiment of a graphical user interface for creating and maintaining an information grid consistent with the principles of the invention.

DESCRIPTION OF THE EMBODIMENTS

Reference will now be made in detail to exemplary embodiments, examples of which are illustrated in the accompanying drawings. Wherever convenient, similar reference numbers will be used throughout the drawings to refer to the same or like parts. The implementations set forth in the following description do not represent all implementations consistent with the claimed invention. Instead, they are merely some examples of systems and methods consistent with the invention.

Overview

Embodiments of systems and methods consistent with the principles of the invention use a common, generic, data/object model to represent information grids or lookup tables, such as a mortgage asset pricing information grid. The model allows a common software representation for logically different attributes, fostering consistency in the interpretation of the data, reuse of certain application components such as data and object models, persistence logic, and user interface constructs.

Information Grid

Mortgage buyers, such as Freddie Mac, currently store, manage, and retrieve large volumes of data in grid format for use in assigning prices to mortgage assets. Different combinations of mortgage asset attributes, (such as risk, interest rate, and remaining maturity), result in different values for pricing components, (such as buyup multipliers, buydown multipliers, guarantee fees (Gfees), adjustments such as a seller-specific discount, etc.).

Figure 1:
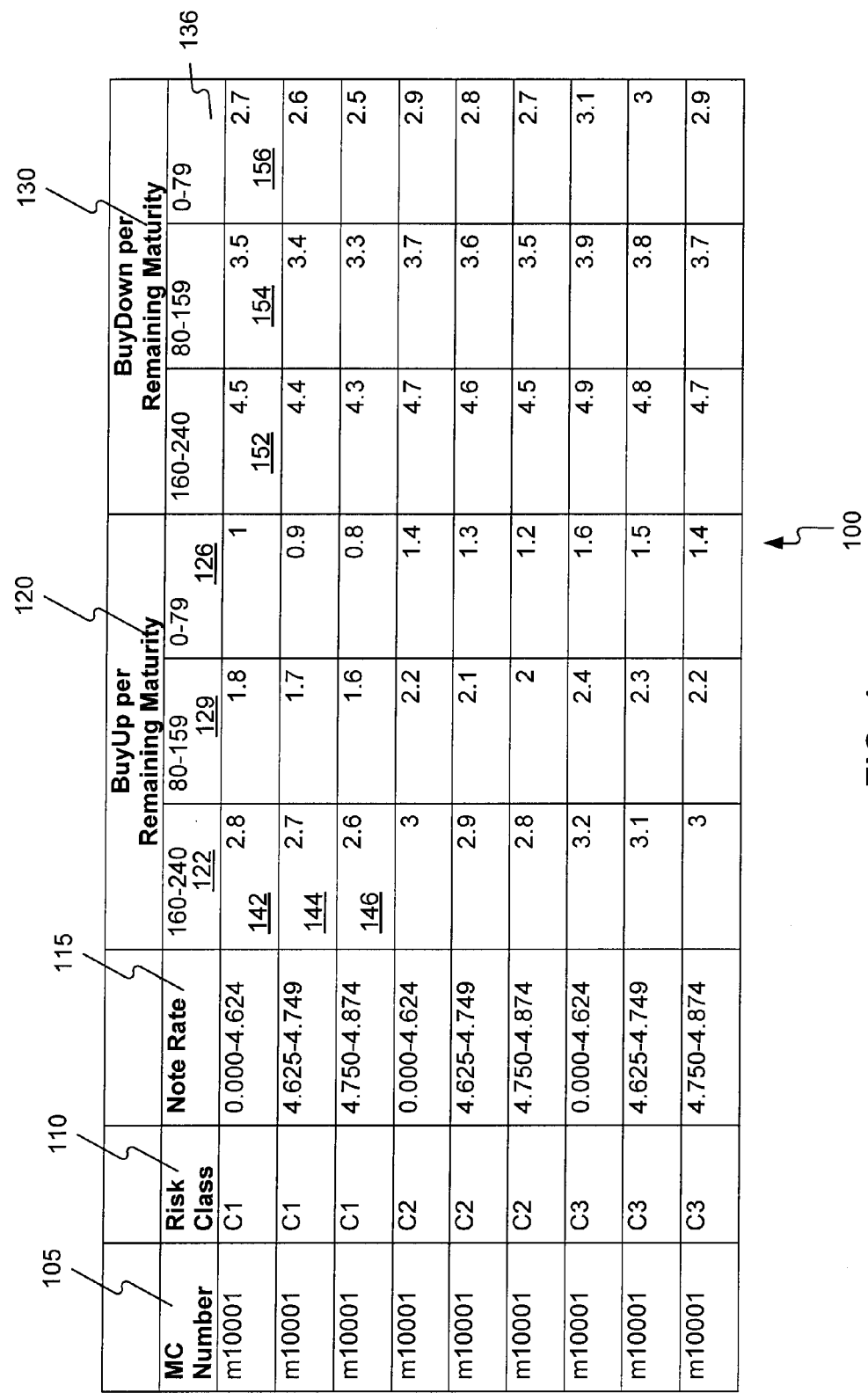
FIG. 1 is an exemplary pricing grid for a mortgage product, consistent with the principles of the present invention.

For example, FIG. 1 is an exemplary representation of a logical grid of pricing information for a mortgage product, consistent with the principles of the present invention. The grid shown in FIG. 1 represents a lookup table for finding the buyup and buydown multipliers for various combinations of mortgage asset attributes, namely MC Number, risk class, note rate, and remaining maturity. "MC Number" denotes a Master Commitment Number, which is a user-assigned identification number used to distinguish from other Master Commitment numbers based, for example, on the type of mortgage asset. A Master Commitment is essentially a contract between a seller, such as a mortgage company, and a buyer, such as Freddie Mac. "Risk class" denotes a risk attribute for a mortgage asset, such as credit risk or prepayment risk. For example, risk class C1 may denote a lower risk mortgage asset than class C2, which may denote a relatively lower risk mortgage asset than class C3. "Note rate" denotes the interest rate of the mortgage asset. "Remaining maturity" denotes the amount of time remaining before the mortgage asset finally matures, such as 180 months remaining on a 360 month mortgage loan.

In the example shown, "BuyUp" and "BuyDown" denotes multiplier amounts used to determine a one-time payment to or from the mortgage asset purchaser in exchange for an increase or reduction of the guarantee fee rate for the mortgage asset. Thus, for a buydown, this number is the multiplier that the mortgage asset buyer charges sellers for a basis point decrease in the guarantee fee. A buydown allows the seller of the mortgage asset to reduce or eliminate the guarantee fee in exchange for a single payment to the buyer, where the buyer also performs a guarantor function, such as Freddie Mac. A buyup has the opposite effect.

In information grids, the "lookup" information may be represented in any manner convenient for a subsequent calculation or other use of that information. For example, in FIG. 1 the "BuyUp" and "BuyDown" lookup values could have been alternately expressed as an amount, in basis points, that the Gfee will be increased (or reduced) for a mortgage, instead of as multiplier values, or in some other way.

As shown, the grid 100 is divided logically into columns, such as the columns labeled "MC Number" 105, "Risk Class" 110, "Note Rate" 115, "BuyUp per Remaining Maturity" 120 and "BuyDown per Remaining Maturity" 130. In the representation shown, some of the columns are further logically divided into subcolumns, such as BuyUP Remaining Maturity "160-240 months" 122, BuyUp Remaining Maturity "80-159 months" 129, and BuyUp Remaining Maturity "0-79 months" 126.

Mortgage asset buyers use the information in a grid such as the one shown in FIG. 1 for determining the correct factor to use in calculating a buyup/buydown price component, and ultimately the net price, for a mortgage asset. "Net price" refers to the total amount of money that the seller will be paid. "Price components" are the separately determined parts that combine to create the net price for a particular mortgage asset. For example, the net price for a mortgage asset may include a guarantee fee (Gfee) plus a seller adjustment amount minus a buy-down amount (or plus a buy-up amount).

For the mortgage asset example, the computation of the pricing components may be performed using the buyer's data system or it may be performed by a third party. If an outside service is being used to perform the computation of a pricing component, the service may also be used to identify and retrieve the necessary data for performing such computation. Furthermore, if multiple pricing components need to be computed, some may be computed by the buyer, while others, often in parallel, may be computed using outside services. In some embodiments, a net pricing service engine may be used to compute the net price for a mortgage asset from pricing components and data received from separate component pricing service(s).

In the specific example of FIG. 1, the information in pricing grid 100 is used to find a buyup or buydown multiplier pricing component for a mortgage asset specified by the attributes in the grid columns. As mentioned, a buydown pricing component reduces the guarantee fee rate on a mortgage asset specified by the attributes in the grid columns, and buy up has the opposite effect.

As shown in FIG. 1, the multiplier for buying up the guarantee fee rate for a mortgage asset having the attributes MC Number="m10001," Risk Class="C1," Note Rate="0-4.624 percent," and Remaining Maturity="60-240 months" is 2.8, which is the lookup value in cell 142. Similarly, a mortgage asset having the same attributes, except with a Note Rate between 4.625 and 4.749 percent, has a BuyUp multiplier of 2.7, (as shown by the value in cell 144), and a similar mortgage asset with a Note Rate between 4.750 and 4.874 percent has a BuyUp multiplier of 2.6 (as represented by the value in cell 146).

Similarly for BuyDown lookups, a mortgage asset having an MC Number attribute of m10001, a Risk Class attribute of C1, a Note Rate attribute of between 0 and 4.624 percent, and a Remaining Maturity attribute of between 160 and 240 months has a BuyDown factor of 4.5 (as show by the value in cell 152). As further examples, a mortgage asset having the same attributes, except with a Remaining Maturity between 80 and 159 months, has a BuyDown factor of 3.5 (as show by the value in cell 154), and a similar mortgage asset with a Remaining Maturity between 0 and 79 months has a BuyDown multiplier of 2.7 (as shown by the value in cell 156). As noted above, the information in grid 100 is used to determine one of the pricing components, BuyUp or Buydown, of a mortgage asset according to the attributes laid out in the rows and columns of the information grid 100.

Information grids are a common way to organize data that is attribute dependent, and pricing grids are a logical way to organize price information because the price of an item is often dependent upon the items attributes. For example, the price components for a new car may be organized in a two dimensional grid with model lines in the rows, optional equipment in the columns, and the additional cost of adding a particular piece of optional equipment to a particular model line listed in the cell at the intersection of the appropriate row and column.

In current computerized pricing systems and other types of information grid lookup systems, information grid implementations are typically static, with attributes and terms represented by individual columns in a database table. Using static database table structures to hold pricing grid information, however, has a number of disadvantages. Perhaps chief among them is the lack of flexibility to change the grid design and data. For example, with a static database table structure holding pricing grid information, a change in pricing policy that uses a not-previously-used attribute requires changes in the pricing engine which executes the pricing algorithm on the grid information, changes to the database user interface to allow the new attribute information to be entered into the database, changes to the database tables by adding columns to hold the new attribute information, data conversions to fill in new pricing information calculated from the new attribute, changes to the data retrieval logic to include the new data from the database tables, and changes to the application object structure to include the new data.

Such static database table implementations foster workarounds that make grid information difficult to create, organize, maintain, access, and report, especially within a large organization having many users of the database grid information. Such workarounds include manual steps in otherwise automated processes that decrease operational efficiency; the use of customized, stand-alone, end-user computing systems that perform further processing of basic, centrally stored grid information, decentralized data entry that lead to data inconsistencies and lack of control of centrally stored grid information; and the use of grid information "adjusters" that are not centrally stored, controlled, accessible, or universally known in the organization.

Information Grid Represented as a Tree

As can be seen in FIG. 1, values for certain attributes are often repeated many times in a tabular data structure, in order to represent every permutation of each attribute and resolve to a unique lookup value (in this case, a buyup or buydown value) for every possible combination of attributes. For example, the three note rate range values (0 to 4.624 percent, 4.625 to 4.749 percent, and 4.750 to 4.874 percent) in note rate column 115 are repeated three times; once each for possible value of the risk class, C1, C2, and C3. Moreover, FIG. 1 is a condensation of the how the information is conventionally stored in a database table, because a tabular data model requires a separate row for each of the three remaining maturity columns, such that each risk class—note rate combination shown in FIG. 1 requires three rows in a tabular database. For example, the one row in FIG. 1 for MC Number m10001, Risk Class C1, and Note Rate 0 to 4.624 percent is stored in three rows in a database table as shown in Table 1:

TABLE 1

| MC Number | Risk Class | Note Rate | R. Maturity | BuyUp | BuyDown |
|---|---|---|---|---|---|
| M10001 | C1 | 0 to 4.624 | 160-240 | 2.8 | 4.5 |
| M10001 | C1 | 0 to 4.624 | 80-159 | 1.8 | 3.5 |
| M10001 | C1 | 0 to 4.624 | 0-79 | 1 | 2.7 |

One embodiment consistent with the invention uses a tree data structure as the common data structure to represent the data in information grids, reducing or eliminating the redundancy of having to represent the same attribute-value pairs many times in the data structure.

Figure 2:
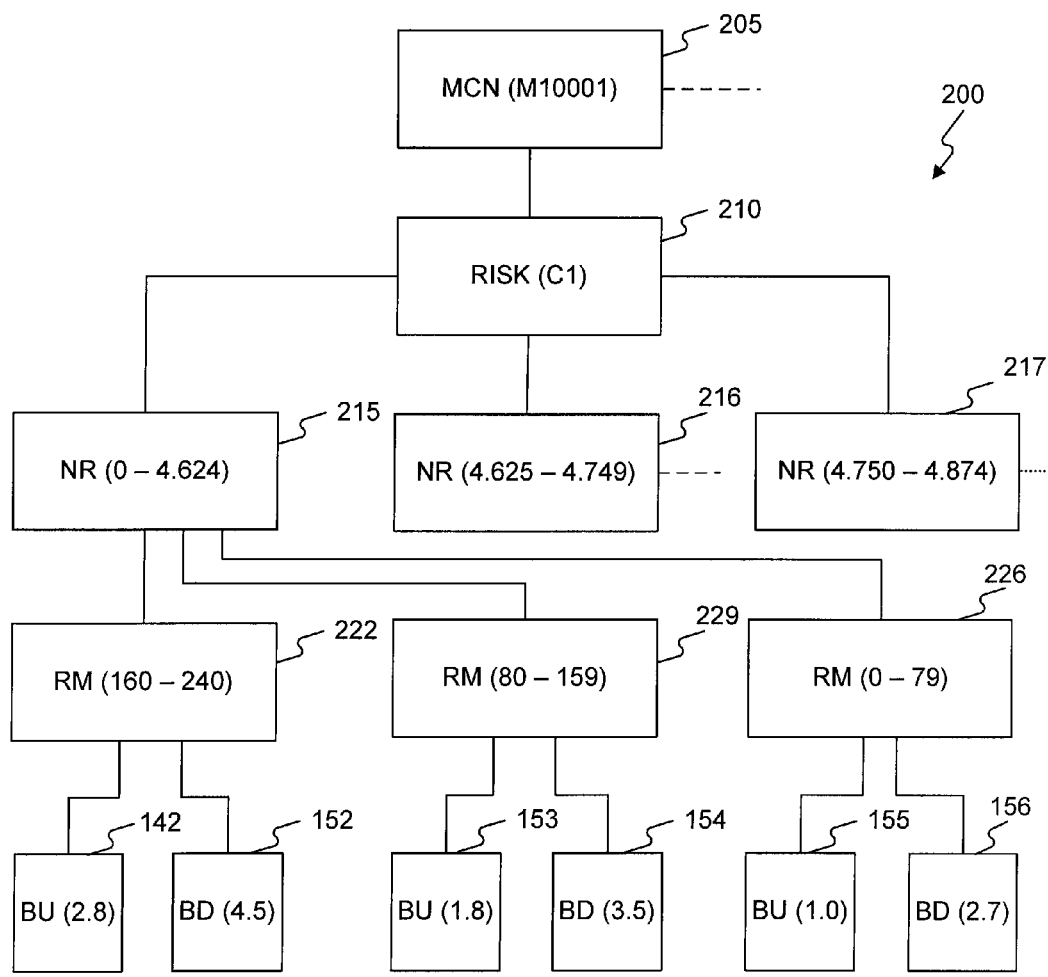
FIG. 2 is an exemplary representation of an information grid in a tree structure, consistent with the principles of the present invention.

FIG. 2 is an exemplary representation of a grid in a tree structure. In this example, a portion of the pricing grid 100 shown in FIG. 1 is represented as a tree structure 200. As shown in FIG. 2, the root node 205 of the tree 200 is the MC Number attribute "M10001." The child of root node 205 is node 210, which corresponds to risk class attribute C1. In grid 100 of FIG. 1, there are three possible risk classes 110: "C1," "C2," and "C3." FIG. 2 shows only the details of risk class C1 at node 210, and the other risk classes C2 and C3 are represented by the dashed line extending from the right side of the box representing root node 205.

Risk class C1 node 210 has three children nodes: node 215, node 216, and node 217. Node 215 represents note rate attribute 0.000%-4.624% under risk class C1 from grid 100 of FIG. 1. Similarly, node 216 and node 217 represent note rate 4.625%-4.749% and note rate 4.750%-4.874%, respectively, under risk class C1 from grid 100 of FIG. 1.

For clarity of illustration, FIG. 2 shows a complete tree representation for only the BuyUp/BuyDown pricing information corresponding to note rate 0.000%-4.624% from grid 100, with the pricing information corresponding to note rate 4.625%-4.749% and note rate 4.750%-4.874% represented in abbreviated form by the dashed lines extending from the sides of the boxes representing nodes 216 and 217.

Node 215, representing note rate 0.000%-4.624%, has three child nodes: node 222, node 229, and node 226. Node 222 represents remaining maturity category attribute 160-240 months for mortgage assets with note rate 0.000%-4.624% and a risk class of C1 as shown in grid 100 of FIG. 1. Similarly, node 226 and node 226 represent remaining maturity categories 80-159 months and 0-79 months, respectively, for mortgage assets with note rate 0.000%-4.624% and a risk class of C1 as shown in grid 100 of FIG. 1.

Each of node 222, node 229, and node 226 has two leafs. A leaf is a type of node that has no children. The leafs in FIG. 2 represent the buyup and buydown information from grid 100 of FIG. 1. For example, node 222 has leaf 142 representing the buyup factor of "2.8" for mortgage assets with a remaining maturity of from 160-240 months, a note rate between 0.000%-4.624%, and a risk class of C1, as shown by buyup factor 142 in grid 100 of FIG. 1. Similarly, node 222 has another leaf 152 representing the buydown factor of "4.2" for mortgage assets with a remaining maturity of from 160-240 months, a note rate between 0.000%-4.624%, and a risk class of C1, as shown by buydown factor 152 in grid 100 of FIG. 1.

Node 229 and node 226 similarly have two leafs representing the buyup and buydown factors for mortgage assets having the attributes specified by the nodes higher in the tree hierarchy. For example, buydown leaf 154 corresponds to buydown factor 154 (value=3.5) in grid 100 of FIG. 1 and buydown leaf 156 corresponds to buydown factor 156 (value=2.7) in grid 100 of FIG. 1.

Figure 3:
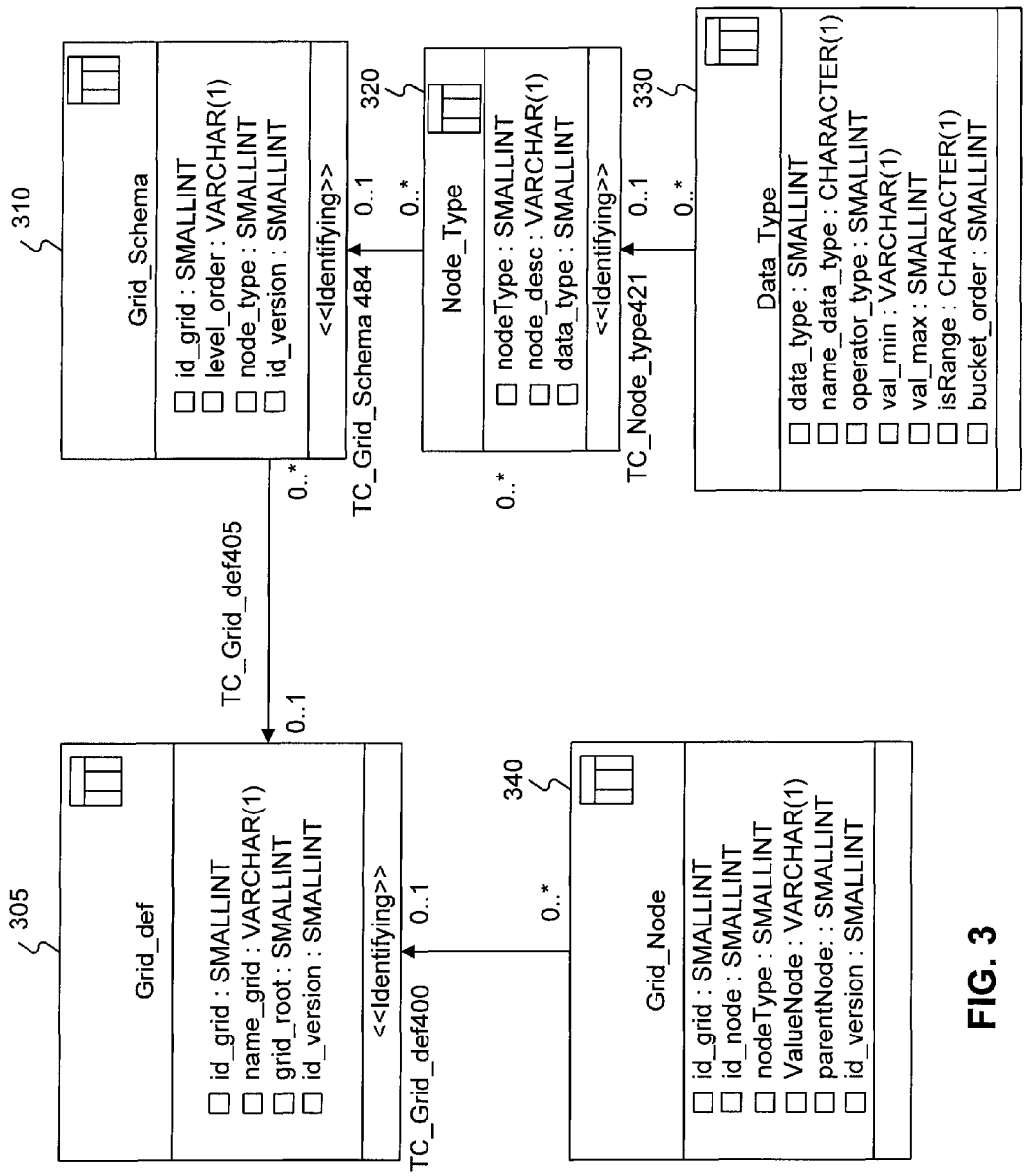
FIG. 3 shows an exemplary data model to support a tree representation of an information grid, consistent with the principles of the invention.

FIG. 3 shows an exemplary data model to implement a tree representation of an information grid, consistent with the principles of the invention. The data model may be used to represent each node of a tree (such as tree 200 of FIG. 2) representing an information grid (such as pricing grid 100 of FIG. 1). As shown, the data model includes a grid definition 305 that includes fields for uniquely defining and identifying a grid, such as a grid id (id_grid), a grid name, a grid root identifier (grid_root), and a version identifier. Grid definition 305 is useful for specifying a particular grid in systems using more than one type of grid (such as one grid used for computing a guarantee fee for a mortgage asset and a second grid used for computing a buydown for the mortgage asset), and systems containing different versions of the same grid (such as an initial version of a buydown grid, and a second, modified version of the buydown grid).

The exemplary data model illustrated in FIG. 3 contains two main parts interrelated to grid definition 305. The first is grid node 340, and the second is grid schema 310, which is itself further related to node type 320 and data type 330. The grid node 340 holds the actual data of a node, including a reference to the node's parent. The grid schema 310 and related node type 320 and data type 330 contains data about grid node 340, (i.e., metadata about a node), specifying grid node 340's place in the tree data structure, node type, and data type. Together, the grid node 340, data structure 305, and the grid schema 310 (with node type 320 and data type 330) specify the data contained in each box or cell of an information grid that is being modeled, and that data's relationship to the other data in the grid, i.e., the cell's position in the information grid, where the grid is represented as a tree model. This data structure can support any number of attributes from an information grid, as now nodes and leafs can be easily added to a tree model without changing the other nodes or the data structure itself.

FIGS. 4-A through 4-E further illustrate the exemplary data structures from FIG. 3 using information from the exemplary pricing grid 100 shown in FIG. 1. FIG. 4-A shows the fields 401 of a grid definition table 405 (corresponding to the grid definition data structure 305 of FIG. 3) and exemplary data for each field 402 based on the information in the exemplary pricing grid 100 of FIG. 1. The fields 401 specify a unique ID for the grid, a name for the grid, the starting node of the grid, and a version ID for the grid. The exemplary values 402 relating to pricing grid 100 show that the id_grid field has a value of 1885 (an arbitrary number), the name_grid field is set to "bubd" (a name meant to indicate buyup/buydown), the grid_root field is set to the value 10001 (which is the value of the MC Number attribute 105 from FIG. 1), and the id_version field is set to the value 1 (indicating this is the first version of this information grid).

FIG. 4-B shows the fields 411 of a grid schema 410 (corresponding to the grid schema data structure 310 of FIG. 3) and exemplary data for each field 412 based on the information in the exemplary pricing grid 100 of FIG. 1. The fields 411 specify the unique ID for the grid, the level of the node in the tree structure representing the grid, the type of node, and the version ID for the node. The exemplary values 412 relating to pricing grid 100 show that the id_grid field has a value of 1885 (corresponding to the value set in grid definition table 405 and indicating the relationship to grid definition table 405), the level_order has possible values of 1-5 (indicating that the tree representation of grid 100 has five possible node levels, as shown in FIG. 2), the node_type field has possible values of 45-50, (indicating that the tree representation of grid 100 has six possible node/leaf types, as shown in FIG. 2), which correspond to specific level_order values, (e.g., a level one node may only be of type 45, but a level 5 leaf may be of type 49 or 50), and the id_version field is set to the value 1 (indicating the current version of the node).

FIG. 4-C shows the fields 421 of a node type 420 (corresponding to the node type data structure 320 of FIG. 3) and exemplary instances of data for each field 422 based on the information in the exemplary pricing grid 100 of FIG. 1. The fields 421 specify the type of the node, the name of the node, and the data type of the node. The exemplary values 422 relating to pricing grid 100 show that the node_type field has possible values of 45-50, the node_desc field has six possible values—"masterCommitmentNumber," "RiskClass," "NoteRate," "RemainingMaturity," "buyup," and "buydown" (corresponding to the six mortgage asset attributes shown in pricing grid 100 and the six possible node/leaf types shown in the tree representation of grid 100 in FIG. 2), and the datatype field has four possible values, 100-103. Each of the datatypes corresponds to a specific nodetype(s). For example, masterCommitmentNumber nodes and RiskClass nodes are of datatype 100, while RemainingMaturity nodes are of datatype 102.

FIG. 4-D shows the fields 431 of a data type 430 (corresponding to the data type data structure 330 of FIG. 3) and exemplary instances of data for each field 442 based on the information in the exemplary pricing grid 100 of FIG. 1. The fields 431 specify the data type of the node, the primitive data type of the node, the kind of operation that can be applied to the data type, the minimum value and maximum value (if the datatype is a range), a range indicator flag, and a bucket number indicating the subrange of a larger range.

The exemplary values 442 relating to pricing grid 100 show that the datatype field has four possible values, 100-103, that the name_data_type primitive uses a string to store datatype 100 and a double length float to store the other data types. The operator type is "RI" (meaning range inclusive) for datatype 101 (444) and datatype 102 (446), and there is no operator type for datatypes 100 and 103 (meaning operations cannot be performed on these datatypes).

Val_min and Val_max have minimum and maximum range values set according to the attribute ranges shown in pricing grid 100, and bucket_order specifies the number of subranges for a given datatype. For example, note rate 115 (represented by datatype 101 (444)) has 3 subranges (or buckets), 0.000%-4.624%, 4.625%-4.749%, and 4.750%-4.874%, and the minimum and maximum values of each of these three ranges is specified by val_min, val_max, and bucket_order for datatype 101 (444). Similarly, remaining maturity 120 and 130 (represented by datatype 102 (446)) has 3 subranges (buckets), 160-240 months, 80-159 months, and 0-79 months, and the minimum and maximum values of each of these three ranges is specified by val_min, val_max, and bucket_order for datatype 102 (446). The bucket order field is used for providing consistency in rendering the grid back to a user, as well as in validating the completeness of the grid, particularly where successive numeric value ranges need to be checked to ensure there are no gaps or overlaps. The is Range field is set to "Y" to indicate datatypes that are ranges, and set to "N" to indicate datatypes that are not ranges, such as datatype 100 (masterCommitmentNumber) and datatype 103 (448) (buyup or buydown).

As an example, consider the case were data_type 430 has the values shown in row 445, node_type 420 has the values shown in row 423, grid_schema has the values shown in row 413, and grid_def 405 has the values shown in row 412. This instance of the data structure describes a node having the characteristics of node 215 of FIG. 2. Row 445 also describes the Note Rate 0-4.624% nodes for risk classes C2 and C3 as well (not shown in FIG. 2). Similarly, row 447 describes node 222 of FIG. 2, and the corresponding nodes under risk classes C2 and C3 (not shown). Also similarly, row 448 describes leafs 142, 152, 153, 154, 155, and 156 of FIG. 2, and the corresponding leafs under risk classes C2 and C3 (not shown).

While the above-described exemplary instances of data structures specify generally what each node is and how it fits into a tree representation of an information grid, FIG. 4-E shows exemplary instances of a grid node 440 (corresponding to the grid node data structure 340 of FIG. 3), which contains the actual value(s) for a node described by data type 430, node type 420, and grid schema 410. The exemplary data for each field 452 is based on information in the exemplary pricing grid 100 of FIG. 1, as represented by the tree shown in FIG. 2. The fields 451 specify the unique ID for the grid, a unique ID for the node, the type of node, the value of the node, a reference to the parent node, and the version ID.

The exemplary values 452 relate to specific nodes of tree 200 of FIG. 2, which represents pricing grid 100 of FIG. 1. For example, while Row 445 of the data type 430 describes the three Note Rate 0-4.624% nodes for risk classes C1, C2, and C3, the added information from row 454 of grid node 440 shows that this data structure corresponds to node 215 of tree 200, which is a node in the path to all the buyup and buydown values for the three remaining maturity buckets under risk class C1, note rate 0-4.624% as shown in FIG. 2.

In another example, the values in row 460 of grid node 440 corresponds to leaf 142 of FIG. 2, which corresponds to grid-column intersection 142 of FIG. 1, which indicates a buyup factor of 2.8 for a mortgage asset having MC number M10001, risk class C1, note rate 0-4.624%, and remaining maturity of 160-240 months according to the pricing grid of FIG. 1. As can be seen in row 460 of FIG. 4-E, "ValueNode" is set to 2.8 (the buyup value F56) and node_type is 49, indicating a buyup node of datatype 103, as shown in node_type 420 of FIG. 4-C. Similarly, row 461 of FIG. 4-E, (which corresponds to leaf 152 of FIG. 2 and column-grid intersection 152 of FIG. 1), has "ValueNode" set to 4.5 (the buydown value 458) and node_type set to 50, indicating a buydown node of datatype 103, as shown in node_type 420 of FIG. 4-C.

Using the parentNode fields in the rows 452 and the information in the data type structure 430, node type structure 420, and grid schema 410, one can traverse up through the parent nodes 222, 215, and 210 to the root node 205 of the tree 200. A grid node 440 defines the parent-child relationships, which allows traversal and management of the entire composite structure composed of all the nodes in the tree 200.

One embodiment consistent with the invention represents an information grid in the form of a tree data structure and stores, accesses, and maintains it as such in a database. In this embodiment, to retrieve an information grid or a portion of a grid, the user (e.g., through a client application) specifies a grid ID and one or more nodetypes defined in the grid schema. The system retrieves the schema for the grid and the tree structure is created from the grid criteria specified. Specifying more nodetypes in the criteria will narrow down the result set that is returned. The system returns the result set to the requesting user, which may or may not contain children. In some embodiments, the grid schema may also be returned to the user.

In some embodiments, the user may flatten the result set to display the retrieved node and its child nodes in a tabular form, such a rectangular lookup table or grid layout. A tabular presentation for the user interface may aid the user's comprehension of the data. Nonetheless, how the grid data is displayed to a user is not tightly coupled to, or dictated by, the data structure that holds the grid information. Different user applications may display the grid data differently.

To create a grid, the user specifies a grid id and one (or more) nodetype(s) and its level in the tree. This definition forms the basis for the grid schema and the subsequent grid to be created. A grid tree can then be created and validated based on the grid schema, which is persisted with the tree data.

Tree nodes may be updated via a similar process used to locate a specific node in the retrieval process. In one embodiment, update constraints may be applied to users, and users may be allowed or required to create new versions of grids, leaving old versions intact. In some embodiments, the structure of the tree may be validated after an update occurs.

Figure 5:
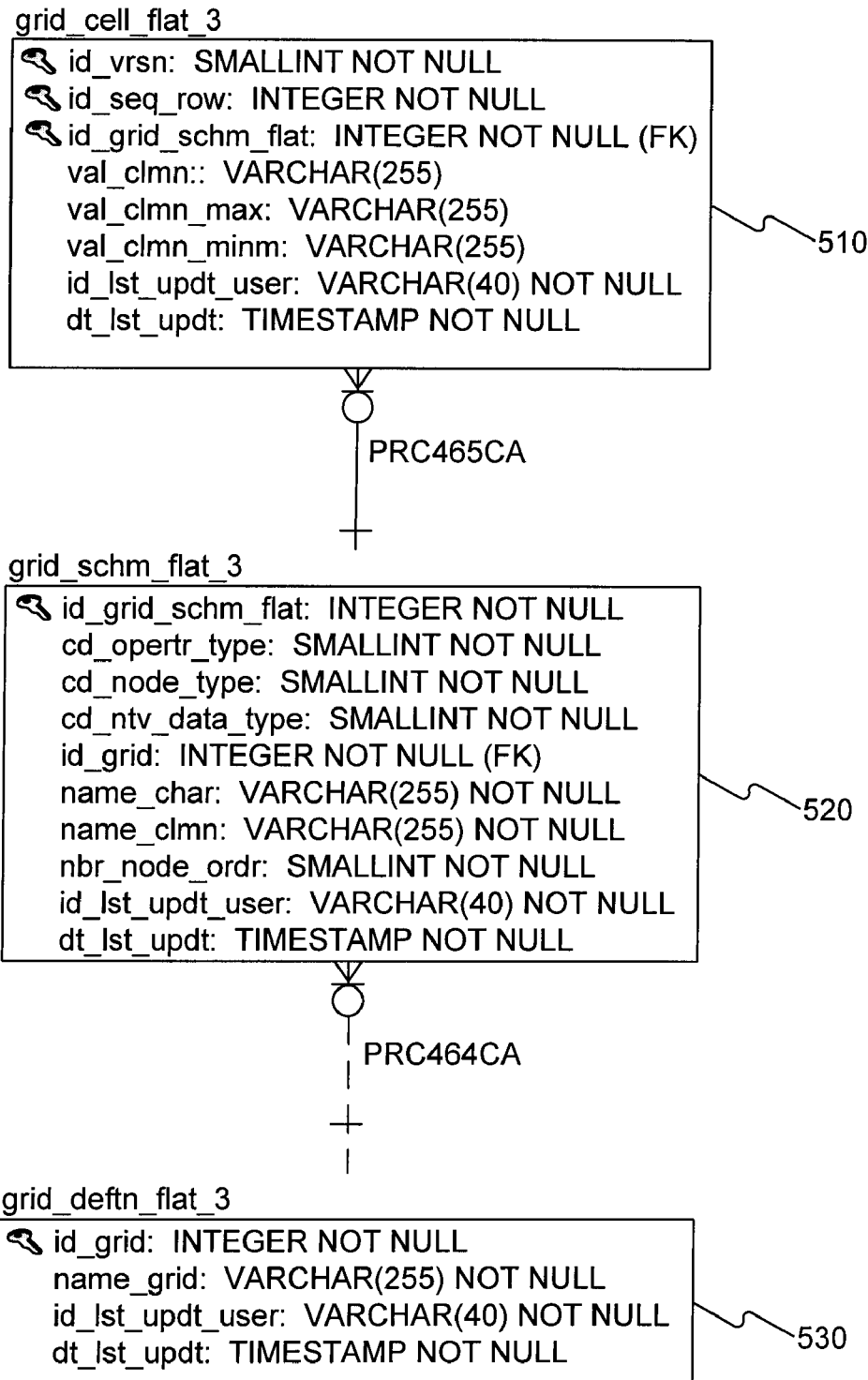
FIG. 5 shows an exemplary data model for a flat grid representation of an information grid, consistent with the principles of the invention.

A tree data structure is not the only way to represent the data in an information grid. FIG. 5 shows an exemplary data model to support a flat grid representation of an information grid, consistent with the principles of the invention. Like the tree data model, this flat data model may be used to represent each cell of an information grid (such as pricing grid 100 of FIG. 1). As shown, the flat data model includes a grid cell representation 510 that includes fields for version ID, row ID, grid schema ID, column value, maximum column value, minimum column value, user who last updated the grid cell, and date of the last update.

As shown, the flat data model also includes a grid schema representation 520 that includes fields for grid schema ID, column value, operator type, node type, data type, grid ID, character name, column name, node order, user who last updated the grid schema, and date of the last update.

The flat data model also includes a grid definition representation 530 that includes fields for grid id, grid name, user who last updated the grid definition, and date of the last update.

Like the tree data model, the flat data specifies both the data contained in each box or cell of an information grid that is being modeled, and the data's relationship to the other data in the grid, i.e., the box's position in the information grid, where the grid is represented as a table.

Some embodiments consistent with the invention represent an information grid in the form of a flat data model and access and maintain it as such in a database.

One embodiment consistent with the invention uses both a tree data model and a flat data model to represent an information grid. In this embodiment, the tree data model is used when an information grid is being created or changed, in order to take advantage of the ease with which the tree model can be validated, and the flat data is used to persist the information grid in storage, in order to take advantage of the storage access speed provided by the flat data model, which may be significantly faster than that offered by the tree data model in some implementations. In this embodiment, a common grid interface provides an interface for client applications that works for both tree model objects and flat model objects.

In yet another embodiment consistent with the invention, the attributes for an information grid may be placed in a denormalized vertical table with a fixed number of columns. This embodiment also uses a metadata table that describes the attributes in the denormalized vertical table, and the metadata table coupled with the entries in the denormalized vertical table defines the information grid. This embodiment uses a predefined, N generic column table large enough to hold all the potential attributes for the data in the information grid. At least initially, some of the columns will contain nulls as there will be no corresponding data from the information grid. As attributes are added to the information grid, previously null columns are used to hold the additional information. Data retrieval from this data structure is simple row retrieval, as contrasted with the more complex node traversal of the tree data structure embodiment.

One of ordinary skill will recognize that the data models described, such as the tree data model of FIG. 3 and the flat grid model of FIG. 5, are generic models that may be used to represent any type of information grid. Thus, common user interfaces and common create, read, update, and delete operations, etc. that work with the tree data model can be used to work with many different information grids implemented using the tree model. For instance, to continue with the pricing grid examples, determining the price of a mortgage asset may involve gathering pricing components from several pricing grids, such as a pricing grid that contains information to determine the guarantee fee for the mortgage asset, a pricing grid that contains information to determine the seller-specific discounts for the mortgage asset, and a pricing grid to determine the buyup/buydown payment. Each of these information grids typically use different combinations of loan-specific attributes, contract-specific attributes, and/or product-specific attributes to define their pricing components. Nonetheless, by using a common data model to represent each of the pricing grids, they may all be accessed using the same client applications to determine the net price for the mortgage asset. Data management and maintenance and control of the information in the information grids may also be similarly simplified by the use of the same client maintenance and control client applications for all of the grids.

In addition to the above information represented by the data models, the data models may also be used to represent information regarding the pricing of cash flow components and credit risk components of a mortgage or mortgage-backed security. A mortgage may have a note rate (e.g., 5%, 5.25%, and 5.50%), and each underlying loan in a mortgage-backed security may also have a note rate. When a mortgage is grouped with one or more additional mortgages and packaged into a mortgage-backed security, the issuer of the mortgage-backed security may price the cash flow of the mortgage-backed security. For example, if a group of mortgages that each have a 5% note rate are packaged, a portion of the note rate (e.g., 25 basis points or 0.25%) may be applied as a servicing charge that is paid to the issuer of the security. In addition, a portion of the note rate (e.g., 4.50%) may be applied to a payment that the purchaser and holder of the security receives. Moreover, the remaining portion of the note rate (e.g., 25 basis points or 0.25%) may be excess interest that may be packaged into a different mortgage-backed security or held in the portfolio of the issuer.

This information associated with the re-pricing of currently owned mortgages may also be contained in the tree data model of FIG. 3 and the flat grid model of FIG. 5. The underlying method of storing, updating, and processing the information applied to pricing a mortgage may also be applied to re-pricing currently owned mortgages and mortgage-backed securities.

As stated above, the credit risk associated with a mortgage asset may be used by mortgage asset purchasers to determine the price they are willing to pay a seller for the mortgage asset. The credit risk, which may indicate a risk of default by the mortgage holder, may have one or more characteristics that may be used to calculate the risk. These characteristics may include a loan-to-value (LTV) ratio that indicates the amount of a first mortgage as a percentage of the total appraised value of a property, the FICO score of the borrower, the geographical location of the property securing the mortgage, and the use of the property (e.g., residential or investment).

This credit risk information may also be contained in the tree data model of FIG. 3 and the flat grid model of FIG. 5. The underlying method of storing, updating, and processing the information applied to pricing a mortgage may also be applied to assessing a credit risk of a property.

User Interface to Grid Data

Figure 6:
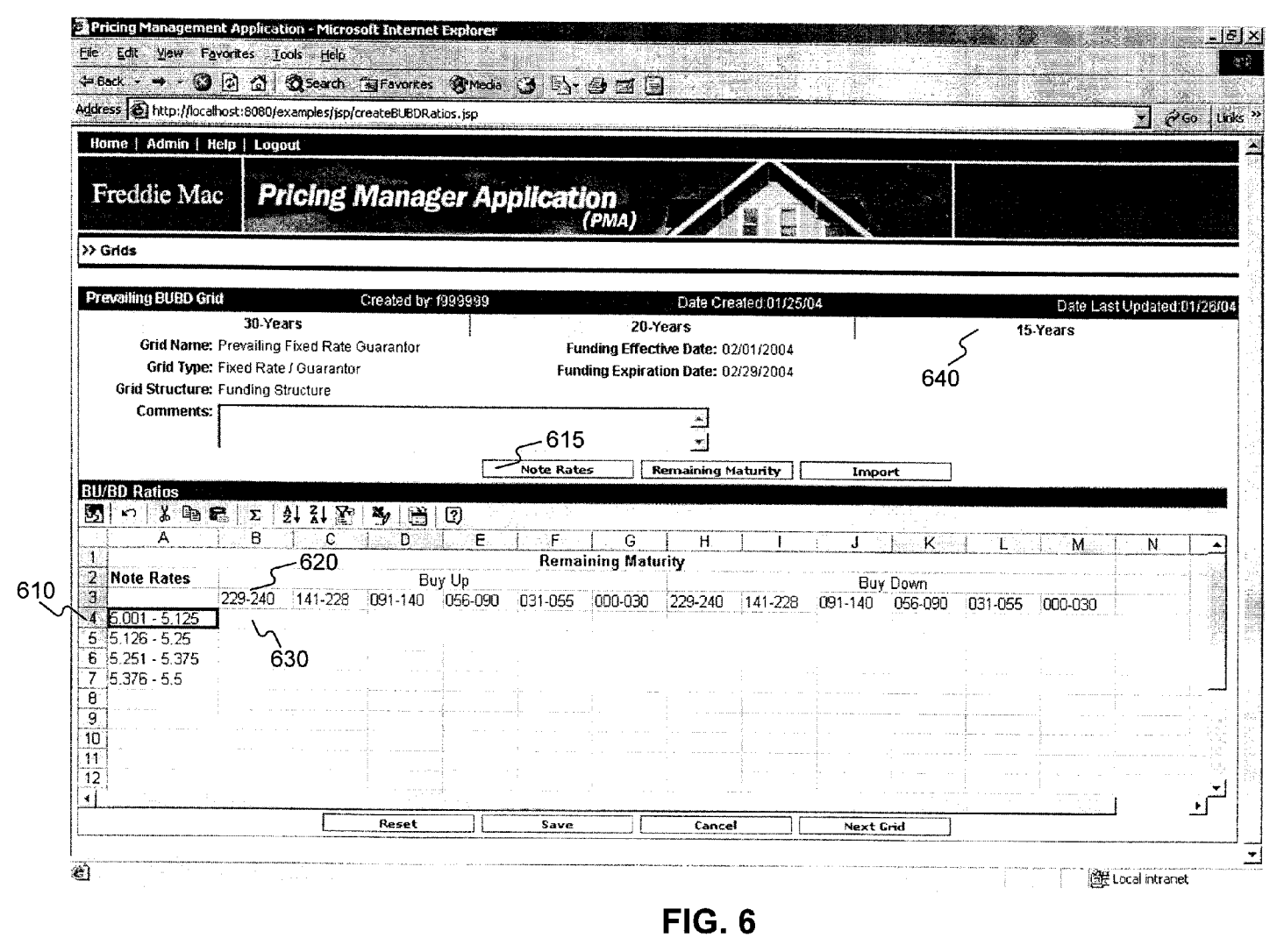

In one embodiment consistent with the invention, information grids, such as pricing grid 100, are created and maintained by a user using a GUI front-end, which may be web-based. FIG. 6 shows an exemplary embodiment of a graphical user interface for creating and maintaining an information grid consistent with the principles of the invention. As shown, an information grid is presented to the user in a logical, two-dimensional tabular format, regardless of whether the underlying data model is a tree model, or a flat grid model, or some other model. The example of FIG. 6 illustrates a mortgage asset pricing grid interface, and as shown, enumerated attributes, such as the type of mortgage asset, may be represented as a series of tabs indicating the possible values of the attribute 640. Attributes with more user-adjustable variability, such as subranges of a note rate, may be selectable by a button, such as note rates button 615, and once selected, entered by the user in a tabular format 610. Similarly, other attributes, such as remaining maturity range 620, may be adjusted by the user, changing the number and/or size of the "buckets" that categorize a mortgage asset in this example. Also similarly, the user may enter the values of the buyup and buydown factors for each combination of note range bucket and remaining maturity bucket, such as entering a the buyup value for note rate 5.001-5.125%, remaining maturity 229-240 months in cell 630. In one embodiment consistent with the invention, values entered by a user, such as note rate range value 610 or buyup factor 630, are validated by the system to be sure they are within acceptable ranges, do not overlap, are the correct data type, etc.

In one embodiment consistent with the invention, this single user interface and data management model is used to create, read, update, and delete information in multiple grids of information, such as a buyup/buydown price component grid, a Gfee price component grid, and a discount price component grid, because all of the multiple grids are modeled in the same way.

In one embodiment consistent with the invention, the user interface is implemented as a JSP/J2EE™ web application, using MS Office™ web components for Excel™ spreadsheet, which allows users to enter, manipulate, save, and retrieve information grid data. One of ordinary skill will recognize that other ActiveX™ controls, or equivalents to ActiveX™ controls, could be easily substituted to provide the same functionality as MS Office™ web components.

One embodiment implements a set of common interfaces representing the grid model, and clients (such as such as an application presenting the GUI of FIG. 6) are not concerned with the actual underlying implementation (e.g. tree data model, flat data model, or some other data model that generically represents both the value and the meaning and context of the data in an information grid). Thus, if the underlying data model implementations are later changed, the clients are unaffected, as the common interfaces remain the same.

Computing System

Figure 7:
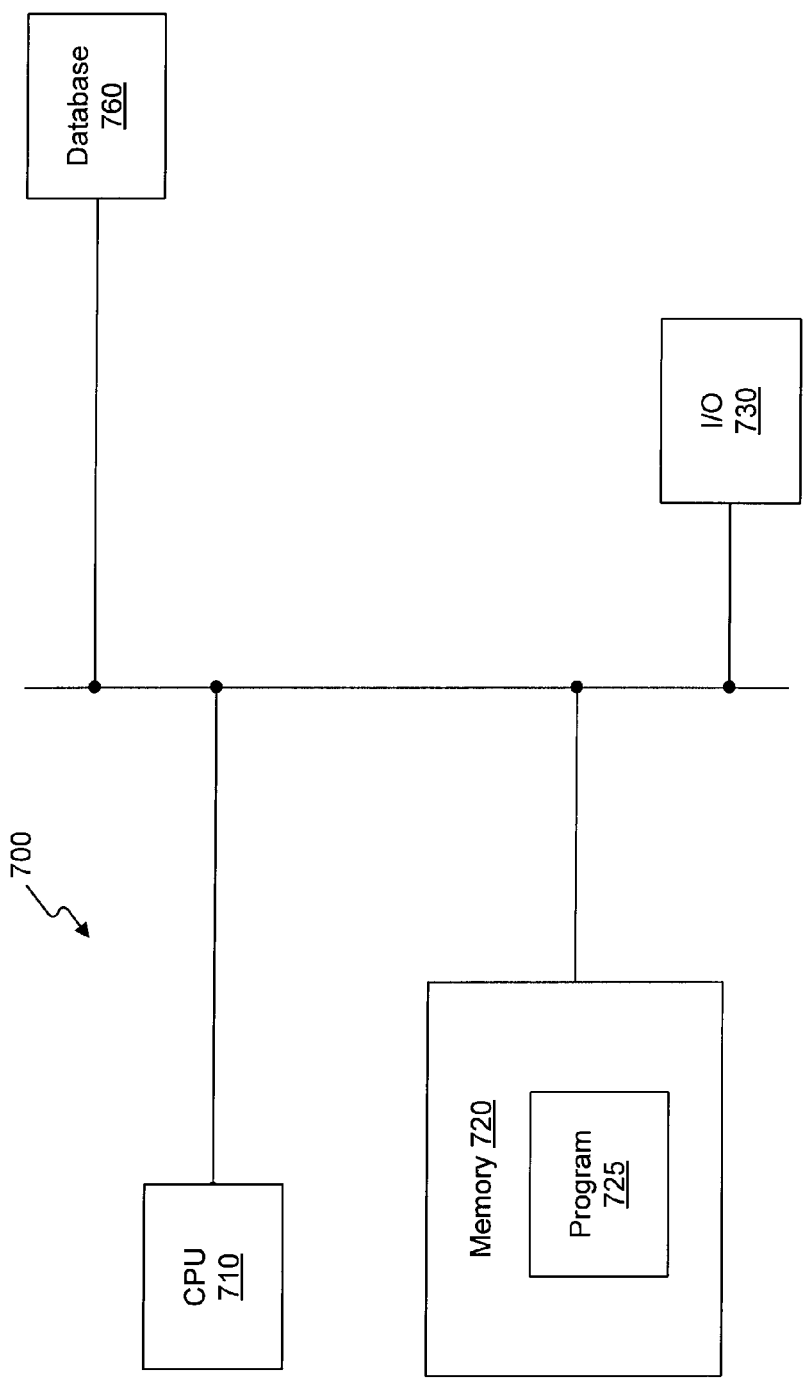
FIG. 7 illustrates an exemplary computing system that can be used to implement embodiments of the invention.

FIG. 7 illustrates an exemplary computing system 700 that can be used to implement embodiments of the invention. The components and arrangement, however, are not critical to the invention. One of ordinary skill will recognize that embodiments of the invention may be implemented by computers or workstations organized as shown, organized in a distributed processing system architecture, or organized in myriad suitable combinations of software, hardware, and/or firmware.

As shown, system 700 includes a number of components, such as a central processing unit (CPU) 710, a memory 720, an input/output (I/O) device(s) 730, and a database 760 that can be implemented in various ways. For example, an integrated platform (such as a workstation, personal computer, laptop, etc.) may comprise CPU 710, memory 720, and I/O devices 730. In such a configuration, components 710, 720, and 730 may connect through a local bus interface and access to database 760 (implemented as a separate database system) may be facilitated through a direct communication link, a local area network (LAN), a wide area network (WAN) and/or other suitable connections.

CPU 710 may be one or more known processing devices, such as a microprocessor from the Pentium family manufactured by Intel™ or a mainframe-class processor. Memory 720 may be one or more storage devices configured to store information used by CPU 710 to perform certain functions, operations, and steps related to embodiments of the present invention. Memory 720 may be a magnetic, semiconductor, tape, optical, or other type of storage device. In one embodiment, memory 720 includes one or more software application programs 725 that, when executed by CPU 710, perform various processes consistent with the present invention. For example, memory 720 may include a tree model application 725 that, when executed by CPU 710, creates objects representing an information grid as a tree data structure. For another example, memory 720 may include a flat model application 725 that, when executed by CPU 710, creates objects representing an information grid as a flat data structure. Memory 720 may also include other programs that perform other functions consistent with embodiments of the invention, such as a program that provides a user interface that displays and allows manipulation of the tree data in a tabular format.

Methods, systems, and articles of manufacture consistent with the present invention are not limited to programs configured to perform dedicated tasks. For example, memory 720 may be configured with a program 725 that performs several functions consistent with the invention when executed by CPU 710. Alternatively, CPU 710 may execute one or more programs located remotely from system 700. For example, system 700 may access one or more remote programs that, when executed, perform functions related to embodiments of the present invention. The configuration and number of programs implementing processes consistent with the invention are not critical to the invention.

Memory 720 may be also be configured with an operating system (not shown) that performs several functions well known in the art when executed by CPU 710. By way of example, the operating system may be Microsoft Windows™, Unix™, Linux™, an Apple™ operating system such as MAC OSX™, Personal Digital Assistant operating system such as Microsoft CE™, or other operating system. The choice of operating system, and even to the use of an operating system, is not critical to the invention.

I/O device(s) 730 may comprise one or more input/output devices that allow data to be received and/or transmitted by system 700. For example, I/O device 730 may include one or more input devices, such as a network connection, keyboard, touch screen, mouse, microphone, and the like, that enable data to be input or received from a user. Further, I/O device 730 may include one or more output devices, such as a network connection, display screen, printer, speaker devices, and the like, that enable data to be output or presented to a user. The configuration and number of input and/or output devices incorporated in I/O device 730 are not critical to the invention.

Database 760 may comprise one or more databases that store information and are accessed and managed through system 700. By way of example, database 760 may be an Oracle™ database, a Sybase™ database, or other relational database. One embodiment described above uses database 760 to persist the common data models representing information grids. Systems and methods of the present invention, however, are not limited to separate databases or even to the use of a database as other organized collections of data or memory systems will serve as well.

Although many of the foregoing examples were presented in the context of pricing for mortgage assets using an information grid in the form of a mortgage component pricing grid, one of ordinary skill will recognize that the principles of the invention are not necessarily so narrowly limited.

The foregoing description of possible implementations and embodiments consistent with the present invention does not represent a comprehensive list of all such implementations or all variations of the implementations described. The description of only some implementations should not be construed as an intent to exclude other implementations. Other embodiments of the invention will be apparent to those skilled in the art from consideration of the specification and practice of the invention disclosed herein. One of ordinary skill in the art will understand how to implement the invention in the appended claims in other ways using equivalents and alternatives that do not depart from the scope of the following claims. It is intended that the specification and examples be considered as exemplary only, with a true scope and spirit of the invention being indicated by the following claims.

What is claimed is:

1. A non-transitory computer-readable recording medium storing computer-executable program instructions which, when executed by a processor, perform a method for representing one or more information grids having a plurality of cells, each cell having a value and a location in the information grid, comprising the steps implemented by a computer of:

receiving pricing data from a plurality of grids including attributes that define pricing components;

creating the one or more information grids comprising a plurality of cells, wherein each cell contains a value representing data from the plurality of grids;

creating a tree node structure that includes a plurality of tree nodes that represent each of the values;

storing the value of a cell in each of the tree nodes;

creating a data model that represents each tree node;

storing, in the data model, a grid definition identifying the information grid, a grid node storing the value of the cell and containing a reference to a parent node, and a grid schema specifying a location of the grid node in the tree structure;

creating a metadata component, associated with the tree node, that holds a description of the location of the cell within the information grid;

storing, in the metadata component, information describing the location of the cell within the information grid;

storing the metadata component in the data model;

accessing the tree node according to the location of the cell in the information grid; and displaying the value stored in the accessed tree node.

2. The method of claim 1, wherein the metadata component holds information identifying a specific tree, a level of the tree node within the specific tree, a node type describing the tree node, and a data type describing the data of the tree nodes.

3. The method of claim 2, wherein the specific tree corresponds to a pricing component of a mortgage asset, the node type corresponds to a type of attribute of the mortgage asset, and the value corresponds to an attribute value for the mortgage asset.

4. The method of claim 1, wherein displaying further comprises:

formatting information from the accessed data structure into a table; and displaying the table to the user.

5. The method of claim 1, wherein the values expire at predetermined times.

6. The method of claim 1, wherein the values expire at different times.

7. The method of claim 1, wherein each of the information grids contain different attributes that define their pricing components.

8. The method of claim 1, wherein each of the information grids has more than one version.

9. The method of claim 1, wherein the one or more information grids are grids for pricing mortgage assets.

10. The method of claim 1, wherein the one or more information grids are grids for re-pricing currently owned mortgage assets.

11. The method of claim 1, wherein the one or more information grids are grids for pricing a credit risk.

* * * * *